United States Patent
Olivieri et al.

(10) Patent No.: US 7,817,092 B1
(45) Date of Patent: Oct. 19, 2010

(54) AGILE ELECTROMAGNETIC GEOLOCATION

(75) Inventors: Marc P. Olivieri, Marlton, NJ (US); Gregory W. Barnett, Merchantville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/204,259

(22) Filed: Sep. 4, 2008

(51) Int. Cl.
G01S 3/02 (2006.01)
(52) U.S. Cl. .................. 342/451; 342/463
(58) Field of Classification Search ........... 342/451, 342/457, 463–465; 455/456.1, 457
See application file for complete search history.

(56) References Cited

U.S. PATENT DOCUMENTS

| 4,060,809 A * | 11/1977 | Baghdady ............... 342/451 |
| 2004/0068178 A1 * | 4/2004 | Govari ................. 600/424 |

* cited by examiner

Primary Examiner—Dao L Phan
(74) Attorney, Agent, or Firm—Duane Morris LLP

(57) ABSTRACT

The unknown location of an electromagnetic transmitter is determined by receiving the radiation at plural sensors distributed over an area. Received power is determined at each sensor, and normalized by taking ratios of powers from the various sensors. A plurality of transmitter locations are hypothesized, and losses from each hypothesized location to each sensor are estimated or measured. The losses are normalized. The differences between the normalized powers and normalized losses are integrated, and the mean-square values determined. The location at which the mean-square value is minimum is deemed to be the location of the transmitter.

3 Claims, 5 Drawing Sheets

$P_1, P_2, P_3, P_4$ measured power at sensors $S_1, S_2, S_3, S_4$ respectively for transmitter T location.

$p_1, p_2, p_3, p_4$ are estimated power losses from hypothesis location h at sensors $S_1, S_2, S_3, S_4$ locations.

FIG. 3A

|   | A | B | C | D | E | F |
|---|---|---|---|---|---|---|
| 1 | F($D_1,A_1$) | F($D_1,B_1$) | F($D_1,C_1$) | ▨ | | |
| 2 | F($D_1,A_2$) | | | | | |
| 3 | | | | | | |
| 4 | | | | | | |
| 5 | | | | | | |
| 6 | F($D_1,A_6$) | | | | | F($D_1,F_6$) |

|   | A | B | C | D | E | F |
|---|---|---|---|---|---|---|
| 1 | F($B_3,A_1$) | F($B_3,B_1$) | F($B_3,C_1$) | | | |
| 2 | F($B_3,A_2$) | | | | | |
| 3 | | ▨ | | | | |
| 4 | | | | | | |
| 5 | | | | | | |
| 6 | F($B_3,A_6$) | | | | | F($B_3,F_6$) |

|   | A | B | C | D | E | F |
|---|---|---|---|---|---|---|
| 1 | F($C_6,A_1$) | F($C_6,B_1$) | F($C_6,C_1$) | | | |
| 2 | | | | | | |
| 3 | | | | | | |
| 4 | | | | | | |
| 5 | | | | | | |
| 6 | F($C_6,A_6$) | | ▨ | | | F($C_6,F_6$) |

|   | A | B | C | D | E | F |
|---|---|---|---|---|---|---|
| 1 | F($F_5,A_1$) | F($F_5,B_1$) | F($F_5,C_1$) | | | |
| 2 | | | | | | |
| 3 | | | | | | |
| 4 | | | | | | |
| 5 | | | | | | ▨ |
| 6 | F($F_5,A_6$) | | | | | F($F_5,F_6$) |

304

| | 1 | 2 | 3 | 4 | 5 | 6 |
|---|---|---|---|---|---|---|
| 1 | -41.4111 | -45.8529 | -60.9932 | -120 | -60.9294 | -41.1966 |
| 2 | -51.2078 | -58.0991 | -48.5283 | -53.1598 | -43.4977 | -33.1547 |
| 3 | -59.6048 | -120 | -47.6339 | -23.2695 | -23.1436 | -31.1264 |
| 4 | -47.3081 | -52.3163 | -32.9768 | 0 | -33.6528 | -54.436 |
| 5 | -37.7149 | -44.7135 | -50.6804 | -37.932 | -52.2157 | -120 |
| 6 | -40.9564 | -59.914 | -120 | -56.8024 | -48.2242 | -61.818 |
| 7 | | | | | | |

TABLE I

AGILE ELECTROMAGNETIC GEOLOCATION

BACKGROUND OF THE INVENTION

A problem which is common to military and to search-and-rescue operations is the need to quickly identify the location of a source of electromagnetic (EM) radiation. In the context of search-and-rescue, the person sought will often have a portable cellular telephone with which communication is possible, but the person in need of rescue may not know his location or will not be able to adequately articulate it. Since cell-phone batteries often provide a limited amount of active cell-phone operation, especially when the battery is near the end of its life, or when it has not been charged in some time, a limited amount of time may be available in which the cell-phone can be used as an electromagnetic source for traditional triangulation or other locating techniques. In a military scenario, the electromagnetic emitter may be actively attempting to avoid being located. One way to reduce the likelihood of being located is to terminate the transmission as quickly as possible. Thus, there are scenarios in which rapid geolocation of an electromagnetic radiator or emitter is desired.

The problem of geolocation in a timely fashion is extremely difficult due to the complex propagation of electromagnetic energy in environments in which these types of radios are typically used. It can be expected that when rapid geolocation is required, the rural environment will include hills, mountains, and possibly vegetation and structures, while the urban environment will include many structures and reflective objects, both fixed and moving. The reflections due to structures and terrain features, in turn, result in random signal amplitude variations known as fading as the reflections add and subtract at the receiving site.

FIG. 1 is a simplified representation of a portion of a generally flat urban environment 10 including several buildings designated 12, 14, and 16, and two mutually crossing roads 22 and 24. There is a need for a geolocation system which is capable of rapidly identifying the location of a source of electromagnetic radiation. An asterisk (*) 30 at the top of building 14 has been arbitrarily selected to represent the location of an electromagnetic transmitter which is to be geolocated or to have its location determined by remote measurements at locations 20 (a, b, c and d). Note that location 20d is shown as being a vehicle, thereby illustrating that the measurements can be achieved on the move.

SUMMARY OF THE INVENTION

Thus, a method according to an aspect of the invention is for determining the location of a remote electromagnetic radiator. The method comprises the step of placing a plurality of electromagnetic sensors in a region in which the radiator is expected to be located for, at each sensor, generating received electromagnetic signals from the radiator. The power received from the radiator is estimated or measured for each of the sensors, to thereby generate estimated power. A space/power sample set is generated by integrating the estimated power received from the radiator by the combination of at least four of the sensors. A set of propagation losses is generated, representing the propagation losses from all possible, potential or hypothesized radiator locations or grid points in the region to the location of each of the sensors. For each of the hypothesized radiator locations or grid points, the ratio is taken of all possible pairs of propagation losses in the set of propagation losses, to thereby generate ratios of hypothesized- or possible-location power or propagation losses. The ratio is taken of all possible pairs of powers in the space/power sample set to thereby produce power ratios for each pair of space/power samples in the set. At each possible or hypothesized location of the transmitter or grid point, and for each possible pair, the ratio of the estimated propagation loss for each hypothesized source location is subtracted from the power ratio of the same pair of receivers to produce a ratio quotient value, and the ratio quotient value is squared. The squared values are integrated over all pairs of sensors or receivers, to thereby produce a dimensionless minimized mean squared value of propagation loss ratios matched to ratios of estimated or measured power from each grid point to each sensor location. The expected transmission loss ratios may be computed for each of the pairs of sensor locations. The grid location at which the transmitter is deemed to be located is that grid location having the least or minimum value of minimum mean-squared value of propagation loss matched to ratio of estimated or measured power.

BRIEF DESCRIPTION OF THE DRAWING

FIGS. 3A, 3B, 3C, and 3D represent the region occupied by the sensors and transmitter of FIG. 2 in the form of location grids;

DESCRIPTION OF THE INVENTION

In general, a geolocation system according to an aspect of the invention makes use of plural electromagnetic power sensors located in and about the region in which the electromagnetic radiator is expected to be found. The minimum number of spaced-apart sensors is four, but as many more as may be desired can be used. The sensors may be at fixed locations, or they may be mobile, with the mobile locations effectively providing the benefit of multiple fixed sensors placed along the path of movement, so long as the movement takes place during transmission by the electromagnetic radiator to be located or found.

The area or region in which the electromagnetic radiator is expected to be found is conceptually subdivided into elemental areas. This may be accomplished physically by scribing a plurality of mutually parallel and orthogonal lines onto a map, to effectively define the limits of each elemental area as lying between four such lines. An electronic version of such a subdivided map might define each elemental area as being centered on a set of grid points distributed across the software "map."

Figure 2:
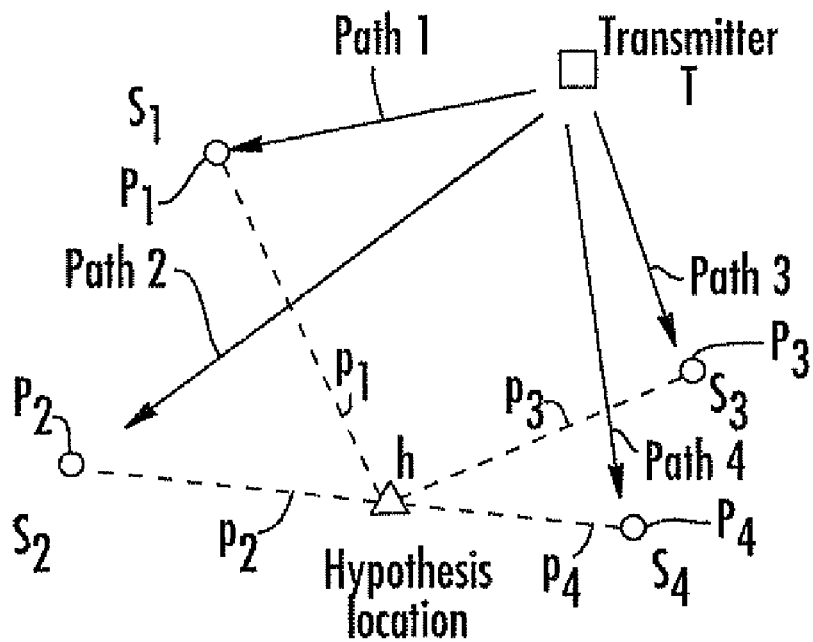
FIG. 2 a simplified conceptual representation of the arrangement of FIG. 1 showing the locations of radio-frequency sensors, the location of the source or transmitter, and some geometry associated with a hypothesized location of the transmitter.

FIG. 2 is a notional plan view of a region occupied by sensors and a transmitter, the location of which is to be determined by processing signals from the sensors. In FIG. 2, S1, S2, 53, and S4 represent the four sensors. The transmitter is designated by a square designated by the letter T. P1, P2, P3, and P4 represent the transmitted power received by sensors S1, S2, 53, and S4, respectively, from the transmitter T by way of Path 1, Path 2, Path 3, and Path 4, respectively. A plurality of locations for the transmitter may be hypothesized. A particular one of the possible hypothesized locations is indicated by the triangle designated h.

In FIG. 2, various lines designated by the alphanumerics p1, p2, p3, and p4 represent the paths extending between hypothesized transmitter location h and the sensors S1, S2, 53, and S4, respectively. The alphanumerics p1, p2, p3, and p4 are also used to represent the estimated power loss values associated with these paths.

In general, the determination of the location of the transmitter is performed by normalizing or taking the ratios of the received powers, and expressing the ratios or normalized values as a matrix $$P = \begin{bmatrix} 1 & P2/P1 & P3/P1 & P4/P1 \\ P1/P2 & 1 & P3/P2 & P4/P2 \\ P1/P3 & P2/P3 & 1 & P4/P3 \\ P1/P4 & P2/P4 & P3/P4 & 1 \end{bmatrix} \quad (1)$$

The loss or attenuation values p1, p2, p3, and p4 between all possible transmitter locations are estimated or measured for the environment of interest; this is the loss attributable to wave propagation from the hypothesized location to each of the sensors (S1, S2, S3, and S4). The ratio is taken of these power losses, and they are expressed in matrix form $$p = \begin{bmatrix} 1 & p2/p1 & p3/p1 & p4/p1 \\ p1/p2 & 1 & p3/p2 & p4/p2 \\ p1/p3 & p2/p3 & 1 & p4/p3 \\ p1/p4 & p2/p4 & p3/p4 & 1 \end{bmatrix} \quad (2)$$

The difference P-p between the ratio of measured power P and the ratio of estimated or measured power losses p is integrated, and the estimated minimum mean square value for the transmitter hypothesis location h is expressed as $$e = \begin{aligned} & W21*\left(\frac{P2}{P1}-\frac{p2}{p1}\right)^2 + W31*\left(\frac{P3}{P1}-\frac{p3}{p1}\right)^2 + W41*\left(\frac{P4}{P1}-\frac{p4}{p1}\right)^2 \\ & + W12*\left(\frac{P1}{P2}-\frac{p1}{p1}\right)^2 + W32*\left(\frac{P3}{P2}-\frac{p3}{p2}\right)^2 + W42*\left(\frac{P4}{P2}-\frac{p4}{p2}\right)^2 \\ & + W13*\left(\frac{P1}{P3}-\frac{p1}{p3}\right)^2 + W21*\left(\frac{P2}{P3}-\frac{p2}{p3}\right)^2 + W43*\left(\frac{P4}{P3}-\frac{p4}{p3}\right)^2 \\ & + W14*\left(\frac{P1}{P4}-\frac{p1}{p4}\right)^2 + W24*\left(\frac{P2}{P4}-\frac{p2}{p4}\right)^2 + W34*\left(\frac{P3}{P4}-\frac{p3}{p4}\right)^2 \end{aligned} \quad (3)$$

The hypothesis location is moved in and around the region of interest to compute errors e at various locations to thereby generate an minimum mean square error (MMSE) map M having a value of error e at each hypothesized map location. If these procedures are performed for all possible hypothesized transmitter locations in a region, the computations will indicate the likely location of the transmitter. The likely location of the transmitter is that location for which the value of error e is minimized.

The power received at any sensor location, once large-scale losses, shadowing and small-scale fading are accounted for, can be expressed as a non-trivial function F(S,T) where S is the sensor location and T is the transmitter location. The power loss between locations is a function of the environment and its determination by means of estimates and or measurement is well known to those skilled in the art.

For convenience, the estimated power loss can be illustrated in the form of a map or matrix that extends over the area or volume of interest by creating a set of back-propagation structures for each sensor location. In these structures, each cell or element contains the estimated power loss between the sensor location and other locations at which the transmitter location could be hypothesized. For convenience, such maps can be obtained by computing the losses from the receiver or sensor to each hypothesized point based on the principle of reciprocity, well known to those skilled in the art. These back-propagation calculations are not strictly necessary, as the losses may be determined by any method, including actual measurement.

Referring to FIGS. 3A, 3B, 3C, and 3D, the locations of the electromagnetic sensors are assigned to elemental areas B3, D1, C6, and F5. It will be understood that there may be more than four sensors, and therefore more than four sensor locations, in the region of interest, and more than four maps. Following the generation of the grid map setting out the locations of the sensors, a back-propagated electromagnetic power loss map is computed.

FIG. 3A is a simplified subdivided planar map 301 including six rows 1, 2, 3, 4, 5, and 6, and six columns A, B, C, D, E, and F, for a total of 36 locations, elements or cells. While only 36 locations are illustrated, such a map may include many more locations. The map may also be three-dimensional, as the height of the transmitters and receivers may be relevant, especially in a hilly or mountainous environment. Each individual location of map 301 may be identified by its row and column. FIG. 3A represents the terrain occupied by the four sensors and the transmitter of FIGS. 1 and 2. Location D1 is hatched in FIG. 3A, to thereby indicate the location of sensor S1 on grid 301. The location of the electromagnetic transmitter T is not known a priori, so is not indicated.

FIG. 3B is a simplified subdivided planar map 302 similar to map 301 of FIG. 3A, and including six rows 1, 2, 3, 4, 5, and 6, and six columns A, B, C, D, E, and F, for a total of 36 locations. Each individual location of map 302 may be identified by its row and column. FIG. 3B represents the same terrain as FIG. 3A. Location B3 is hatched in FIG. 3B, to thereby indicate the location of sensor S2 on grid 302. In a similar manner, FIGS. 3C and 3D are simplified subdivided planar maps 303 and 304, respectively, similar to maps 301 and 302. Each map 303 and 304 includes six rows 1, 2, 3, 4, 5, and 6, and six columns A, B, C, D, E, and F, for a total of 36 locations. Locations C6 and F5 are hatched in FIGS. 3C and 3D, respectively, to thereby indicate the locations of sensors S3 and S4 on grids 303 and 304, respectively.

Figure 1:
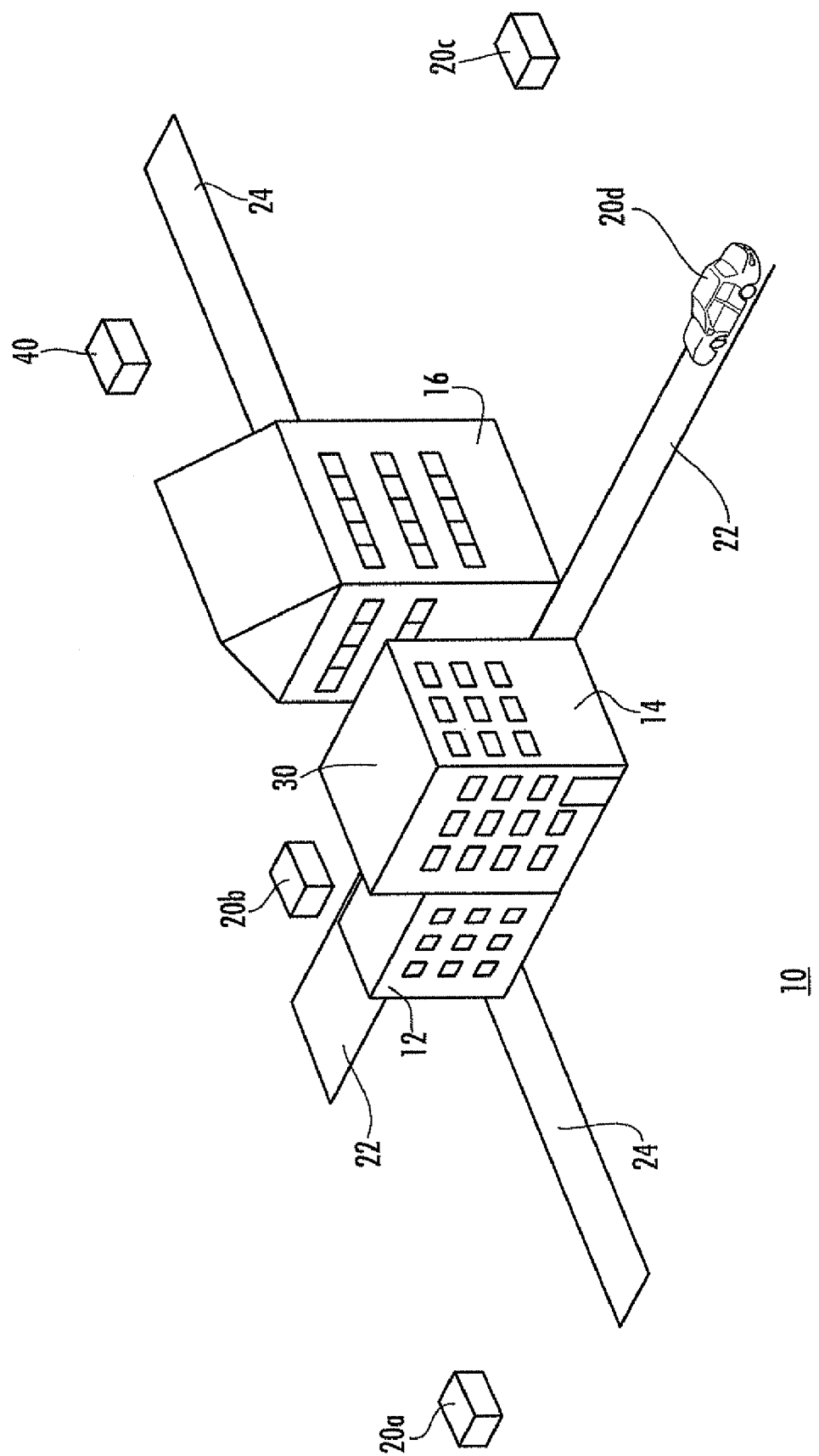
FIG. 1 is a simplified representation of terrain including three buildings, an electromagnetic transmitter or radiation site, and also showing four locations at which electromagnetic sensors may be located to sense the transmitted radiation.

The sensors 20a, 20b, 20c, and 20d of FIG. 1 (corresponding to S1, 52, S3, and S4, respectively, of FIG. 2) are presumed to be able to pass information about their individual locations, received electromagnetic power, and time of measurement of such EM power to a processor, which may be at a fixed and/or mobile site, or distributed among fixed and/or mobile sites. If the sensors are at fixed, known locations, transmission of the sensor locations is not necessary. A single fixed site 40 is illustrated in FIG. 1 as being the processing site. The processing site(s) can communicate with the sensor locations by means of wired or wireless networks, as appropriate. In the case of sensors mounted on vehicles for motion, the intercommunication will perforce be wireless.

According to an aspect of the invention, the unknown location of the electromagnetic transmitter is determined by hypothesizing that the transmitter is located at each map grid point, and performing calculations to compare the amplitude of the signal received at each sensor site with the amplitude of the signal actually received at each sensor site. When all of these calculations are completed, the hypothesized location which best fits the actual received data is deemed to be the actual location of the electromagnetic transmitter.

Each of the elemental grid locations, elements, cells or points of the maps of FIGS. 3A, 3B, 3C, and 3D may be associated or marked with information relating to the estimated power received at the sensor location from the transmitter T, if the transmitter were to be located at the grid element. Thus, in FIG. 3A, grid cell, location, or point A1 is designated F(D1, A1), thus specifying the estimated (hypothesized) power received by the sensor at location D1 from a transmitter, if it were located at grid point A1. Similarly in FIG. 3A, grid location B1 is marked with F(D1, B1) to specify the estimated power which would be received by the sensor at location D1 from a transmitter located at grid cell B1. Grid location C1 of map 301 is marked with F(D1, C1) to indicate the power expected to be received by a sensor at location D1 from a transmitter at location C1. Grid location A2 of map 301 is marked F(D1, A2), grid location A6 is marked F(D1, A6), and grid location F6 is marked F(D1, F6).

The elemental grid points of the maps of FIGS. 3B, 3C, and 3D may also be associated or marked with information relating to the estimated power received at the sensor location from the transmitter T, if the transmitter were to be located at the grid element. Thus, in FIG. 3B, grid location A1 is designated F(B3, A1), thereby specifying the estimated (hypothesized) power received by the sensor at location B3 from a transmitter, if it were located at grid point A1. Similarly in FIG. 3B, grid location B1 is marked with F(B3, B1) to indicate or specify the estimated power which would be received by the sensor at location B3 from a transmitter located at grid cell B1. Grid location C1 of map 302 is marked with F(B3, C1). Grid location A2 of map 302 is marked F(B3, A2), grid location A6 is marked F(B3, A6), and grid location F6 is marked F(B3, F6).

Similarly, in FIG. 3C, grid location A1 of map 303 is designated F(C6, A1), thus specifying the estimated (hypothesized) power received by the sensor at location C6 from a transmitter, if located at grid point A1. Grid location B1 is marked with F(C6, B1) to specify the estimated (hypothesized) power which would be received by the sensor at location C6 from a transmitter located at grid cell B1. Grid location C1 of map 303 is marked with F(C6, C1). Grid location F6 of map 303 is marked F(C6, F6.

In FIG. 3D, grid location A1 of map 304 is marked with F(F5, A1) to specify the estimated (hypothesized) power received by a sensor at location F5 from a transmitter at location A1. Also in FIG. 3D, grid location B1 is marked F(F5, B1), grid location C1 is marked F(F5, C1), and grid location A6 is marked F(F5, A6), and grid location. F6 is marked F(F5, F6).

Thus, according to an aspect of the invention, electromagnetic path loss or attenuation between each elemental area and each of the sensor areas is determined. The determination of path loss can be performed by actual measurement in the field, or it may be based on calculations using normal electromagnetic field equations or simulation software tools to achieve various level of accuracy. A basic precept of electromagnetic propagation is that the signal power at a distance from a source decreases as a function of a power of the distance between the source and the measurement location. The power is often described as being a square (power 2) or cube (power 3), but depends upon the environment.

An equation which may be used to describe the propagation along a path, such as the path between any elemental area and any other elemental area, is $$P_r = \alpha B F(Z,S) P_1 \quad (4)$$

where:
Pr is the received power at a range;
$P_1$ is the power measured at one meter from the source.
α is a random variable attributable to small-scale fading;
B represents the losses (and gains) of the system; and
F(Z,S) is a power loss matrix function representing propagation losses due to spatial spreading, absorption and shadowing and is inversely proportional to the signal power loss. In equations 2 and 3 and in FIG. 2, the values p1, p2, p3 and p4 are also power loss values (p=F). The power loss matrix is a function of the locations of the source and sensor and of the environment, where Z is the vector location of the sensor or receiver in three dimensions, and S is the vector location of the source in three dimensions.

For a complex propagation environment, such as might exist in an urban area, a transmitted signal may traverse several paths between the point of transmission and a receiver location. These paths are together referred to as multipaths, and create the small-scale fading behavior, but on average, the complex power loss function between a transmitter site and a receiver site can be simplified to a log-scale path loss in which the received power can be expressed as $$P_r = \alpha B \frac{1}{r^y} P_1 \quad (5)$$

It should be noted that the fading variable a (a random variable) is dependent not only upon range but also upon azimuth and the environment. Note that the shadowing effect often represented by a log normal stochastic number multiplying the power in dB scale has been eliminated since path diversity and the use of antenna diversity also tends to minimize this stochastic effect. For narrowband signals, the stochastic process of this random variable can be described by a K-Rician distribution.

Figure 4:
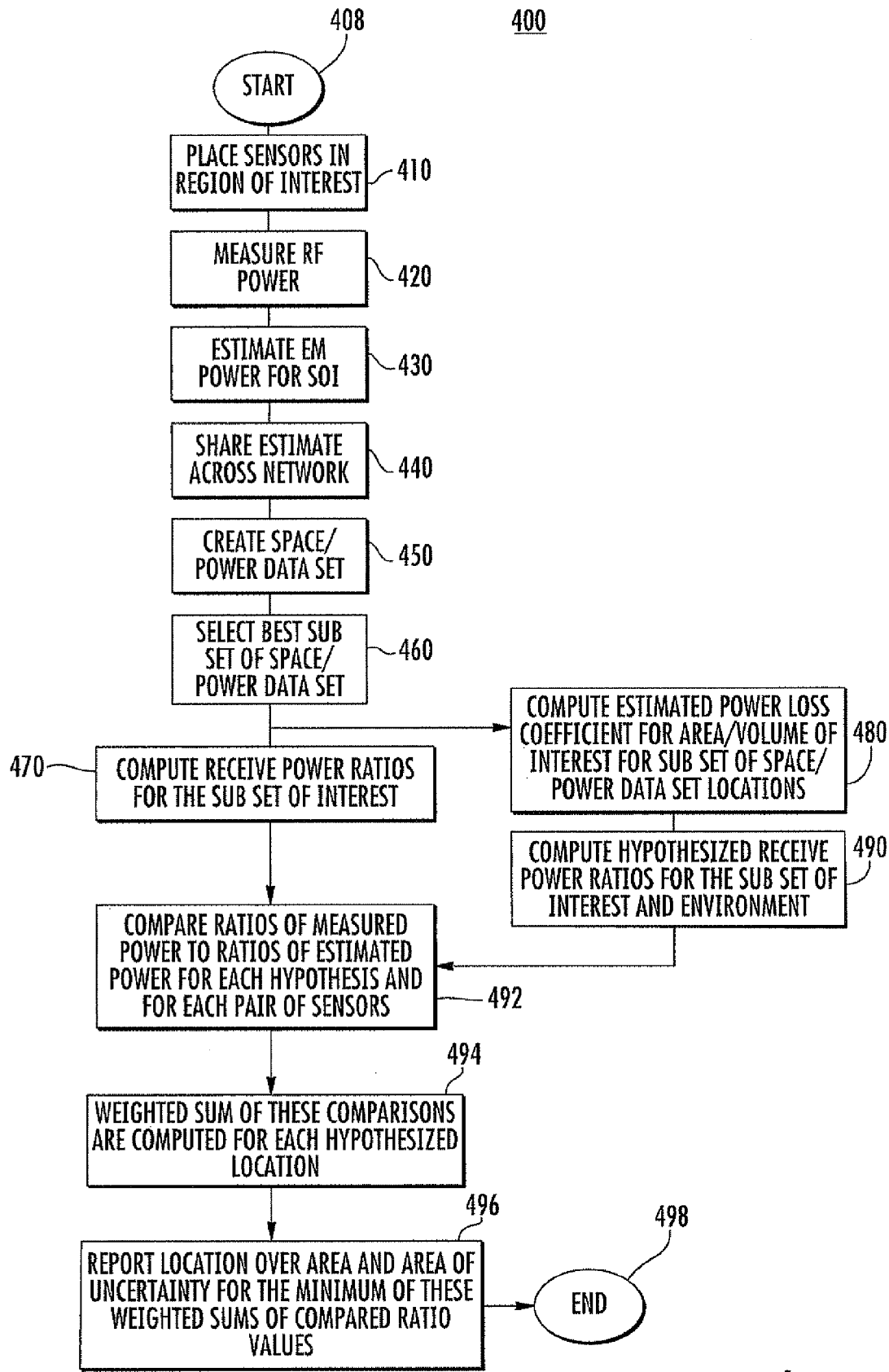
FIG. 4 is a simplified logic flow chart or diagram illustrating steps according to an aspect of the invention.

FIG. 4 illustrates a simplified logic flow chart or diagram 400 illustrating operations or method steps according to an aspect of the invention. In FIG. 4, the logic starts at a START block 408, and flows to a block 410. Block 410 represents the placement of sensors in the region in which the electromagnetic radiator or emitter is to be located. Representative sensor locations are designated by hatching in FIGS. 3A through 3D and are represented in FIG. 2. At some time after placement of the sensors, a transmitter or radiator will transmit RF energy, a portion of which will be captured at each of the sensor locations and the power will be measured, as suggested by block 420 of FIG. 4. The object of the system and method is to identify the location of the transmitter or radiator from these sensed signals. The logic or control of the diagram or chart 400 of FIG. 4 flows from block 420 to a block 430.

Block 430 of FIG. 4 represents processing at each sensor to determine the received power for the signal of interest (SOI). Block 30 may also include diversity reception to reduce the effects of small-scale fading. In order to geolocate an electromagnetic transmitter, the radiation from the transmitter is sensed by each of the sensors, corresponding to the four sensors of FIG. 2 in the example. The power of the electromagnetic energy received at each sensor site is determined. In order to determine the received power, each sensor must, of course, be adjusted or tuned to receive the source signal, and must also use appropriate methods or algorithms, known to those skilled in the art, to limit the effect of noise and interference in the power estimate. Each sensor determines its power received, and transmits by way of a network to a processing location (or to a distributed processor) information relating to the sensed power, possibly including information relating to the reporting sensor location and or the sensing time. The method used to determine the estimated power for the signal of interest may depend upon the specifics of the signal of interest and the relative positions of the sensors relative to the source. More particularly, the received power is estimated using a processing function which, based on a priori information available at the receiver, is tailored to the signal of interest, and to maximize the post-processing signal-to-noise ratio (SNR) to thereby capture all the energy available in the signal of interest.

Once the received power is estimated as described in conjunction with block 430 of FIG. 4, the information is transmitted or conveyed from the sensors to a processor, which may be at a specific location, such as 40 of FIG. 1, or may be distributed. The transmission of the data from the sensors for sharing across the network and processing is represented in FIG. 4 by a block 440.

In Create Space/Power set block 450 of FIG. 4, the system processor computes the Space/Power data set according to equation (2) and records the values. The values are evaluated in block 460 to select or create a best subset determined by combination algorithms in the power/space domain. Block 460 implements the combination algorithm in power/space domain for a signal of interest (SOI). There exist various possible algorithms to do this subset selection/optimization. One such algorithm is as follows. The power measurements from the sensors are associated to a single SOI and displayed in power/space domain where for example, a three dimensional representation could be a plane to represent northing and easting values and a third dimension to represent the power measured at these values. In block 460, that power/space representation is then down sampled and low pass filtered in the space plane using techniques well known by those skilled in the art. The technique can be implemented via well known 2D Fourier transform algorithms. The size of the spatial filter is proportional to the wavelength of the SOI carrier. A follow-on algorithm is used to discard sidelobes of the filtering function, thereby providing the best set of power/space samples. Alternatively, one could use weighting functions, well known to those skilled in the art, for the filters. From block 460, the logic or control 400 of FIG. 4 flows in parallel to blocks 470 and 480. Block 470 computes the received power ratios for the subset of signals which is of interest, and Compute Estimated Power Loss Coefficient block 480 computes the estimated power loss for the area or volume of interest for the subset of space/power data set locations. It should be noted that the computations of block 480 can be performed off-line at an earlier time. Compute Hypothesized Receive Power Ratios block 480 represents generation of the back-propagated electromagnetic power loss maps as illustrated in FIGS. 3A through 3D for each cell or location of interest.

The electromagnetic power loss map prepared in conjunction with block 480 of FIG. 4 can be computed using complex models or by following simple assumptions and simplifications as stated above in the expression of the log-scale path loss equation (equation 5).

Block 470 of FIG. 4 computes the power ratios as shown in equation (1) and block 480 computes the hypothesized power loss ratio given a form of function F in equation (4). A simple log scale path loss exponent function can be used as shown in equation (5), but more complex matching power loss function could also be used to refine the power loss function F in equation (4). Block 490 uses this propagation loss function for each receiver location and for each hypothesized transmitter location to create a matrix in the form of equation (2) with all hypothesized receive power ratios. In block 492, the power ratio received and estimated for the hypothesized locations are compared via a subtraction and a raised power of 2, as set forth in equation (3). A weighted sum in completed in block 494 and seen in equation (3). Equation (3) is performed for all hypothesized source locations in an area of interest in block 496, and the minimum values are reported as the most likely position of the transmitter or emitter.

In FIG. 3B consider the receiver at location B3, elemental area A1 is marked with "F(B3,A1)," representing the propagation loss between elemental areas B3 and A1, and elemental area B1 is marked with "F(B3, B1)," representing the propagation or path loss between elemental areas B3 and B1. The propagation loss may be as determined by conventional propagation models. For example, the Langley-Rice, Okumura Hara, and ray tracing models can be used, or simply $1/r^\gamma$. The map of FIG. 3B is filled in with the propagation loss between each elemental area and sensor location 83, as suggested by the inclusion in elemental area F6 of "F(B3,F6)." It will be understood that each elemental area will be associated with a function F( ) for each sensor on the map.

Other maps for other sensor locations or space/power subset samples of interest are computed. The map of FIG. 3C is filled in with these other functions related to the position C6. This step is represented in FIG. 3C by the notation "F(C6, A1)," representing the propagation loss between sensor location C6 and elemental area A1. All the values of propagation loss between each elemental area and each sensor location are determined. The last such function is for elemental area F6 and sensor location F5, which can be represented by the notation "F(F5,F6)" in location F6. Note that this information includes estimates or predictions of the path loss that will be experienced, and is not actual propagation loss data. Thus, maps corresponding to the maps of FIG. 3 are generated, with propagation loss function entries for each receiver or sensor location. The back-propagated electromagnetic power loss maps must be available to the "central" processor.

Block 492 of FIG. 4 represents, at the processor, combining the theoretical propagation loss information from the maps generated as described in conjunction with FIGS. 2 and 3A through 3D. The sensed power for the SOI and sensor location are combined by $$M(S_H) = \sum_{k=1}^{N_s} \sum_{\substack{l=1 \\ l \neq k}}^{N_s} W_{kl} \left[ \frac{P(Z_l, S)}{P(Z_k, S)} - \frac{F(Z_l, S_H)}{F(Z_k, S_H)} \right]^2 \frac{1}{N_s(N_s - 1)} \quad (6)$$

where:

$M(S_H)$ represents the value of the geolocation map at the hypothesized vector position of the source;

$W_{kl}$ is a quality factor used to weight each component of the averaging process across the various sensor observations; that is, Wkl is a weight assigned to the equation for each possible location pair;

$P(Z_l,S)$ is a propagation or power loss function between the three-dimensional vector location of the $1^{st}$ sensor and the vector location of the source in three dimensions;

$P(Z_k,S)$ is a propagation or power loss function between the three-dimensional vector location of the $k^{th}$ sensor and the vector location of the source in three dimensions;

$F(Z_l,S_H)$ is a propagation or, power loss function between the three-dimensional vector location of the $1^{th}$ sensor and the hypothesized vector location for the source in three dimensions;

$F(Z_k,S_H)$ is a propagation or power loss function between the three-dimensional vector location of the $k^{th}$ sensor and the vector location for the source in three dimensions; and $N_s$ is the total number of sensors.

Figures 5, 6:
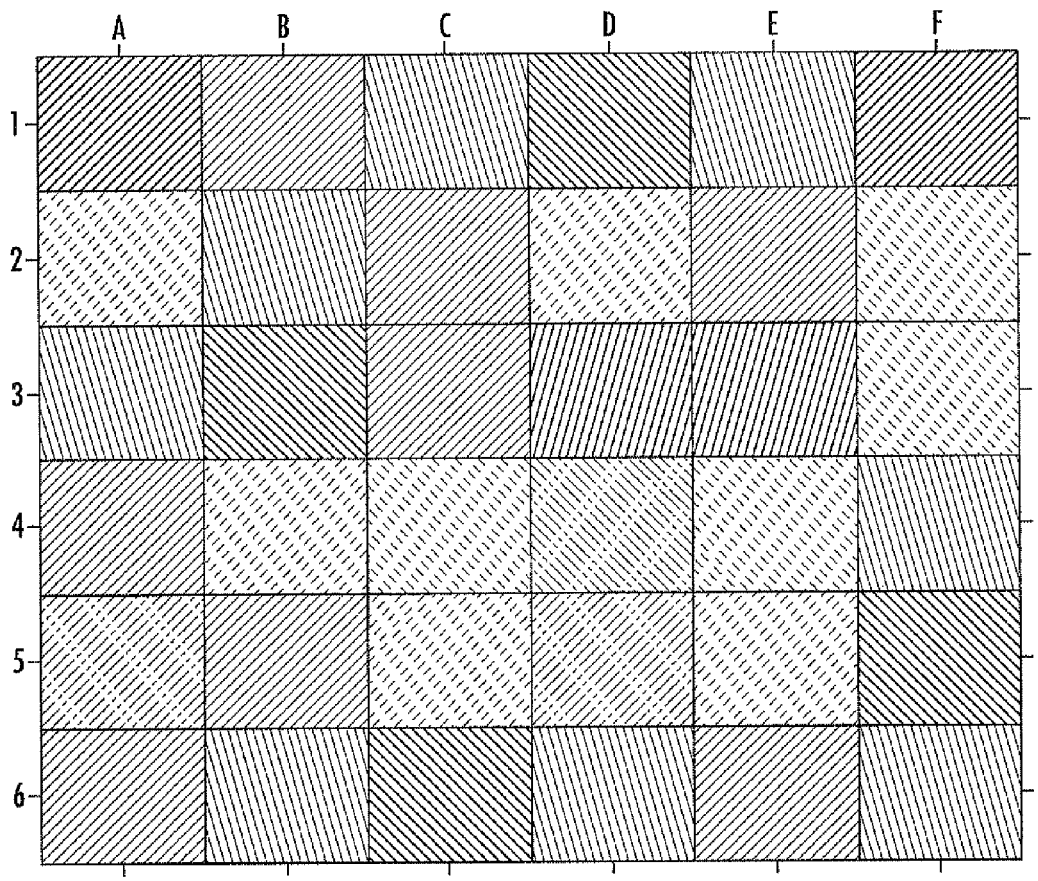
FIG. 5 illustrates cells of a minimum mean square value (MMSE) map.
FIG. 6 is a table of values, designated Table 1, of the cells of the map of FIG. 5.

In Equation (6), $M(S_H)$ represents the value of the geolocation map as seen in FIG. 5. The map displays the 6×6 (A-F, 1-6) minimum mean square error (MMSE), where each cell of the map contains the value computed in equation (6) following normalization to the maximum value in the map. The values are shown in dB in the table of FIG. 6. The transmitter T is at location D-4 in this example and the cell values cover [−120 to 0] dB scale. The 36 values are set forth in Table 1 of FIG. 6. Note the low values capped at −120 dB at the location of the sensors as seen in the examples of FIG. 3 (D-1,B-3,C-6,F-5). This map is computed at the 36 hypothesized transmitter position of the source. That is, Wkl is a weight assigned to the equation for each possible location pair. Equation (3) is calculated for each hypothesized or possible location of the transmitter. In the example of FIGS. 1 AND 2, there are 36 element locations, of which four are occupied by sensors. That leaves 32 possible element locations at which the transmitter might be located. Consequently, equation (3) is calculated for each of those 32 possible locations. For each location, a value of M is determined. The minimum value of M is the most likely location of the source.

The above discussion assumes that the propagation function F(Z,S) between each element location and a sensor location is near the actual value. Another assumption is that the stochastic process of the random variable a has been accounted for in the estimation of power at the sensor location. In other words, the presence of small-scale fading of the received signal can adversely affect the accuracy of the power determination and therefore the accuracy of the geolocation. Under some conditions, the method as so far described may not require any additional processing to give accurate geolocation results. Note that in this method a ratio of power is used to match a ratio of estimated propagation loss in order to eliminate the need to know the source RF power P1 expressed in equation (2) from the transmitter that can vary widely with antenna, battery status and even in some cases the state of the control software that may control the RF emissions of the radio to be located.

When small-scale fading may be a problem, such as in urban or complex reflective environments, preprocessing of the sensed power data may advantageously increase the accuracy of the geolocation. Small-scale fading is substantially ameliorated or eliminated by preprocessing in the form of space-diversity reception. In space-diversity reception, each receiver is fitted with two or more spaced-apart antennas, and selectively selects the stronger or less noisy signal from among the antenna signals, or otherwise processes the received signals, as by separate detection, to reduce the fading effect. Space diversity reception is well known, and finds use, for example, in wireless home Ethernet networks.

Thus, a method according to an aspect of the invention is for determining the location of a remote electromagnetic radiator (30). The method comprises the step (412) of placing a plurality of electromagnetic sensors (20a, 20b, 20c, 20d) or receivers in a region (10) in, which the radiator (30) is expected to be located for, at each sensor (20a, 20b, 20c, 20d), generating received electromagnetic signals or radiation from the radiator (30). The power received from the radiator (30) is estimated or measured (430) for each of the sensors, to thereby generate estimated power. A space/power sample set is generated (450) by integrating the estimated power received from the radiator by the combination of at least four of the sensors. A set of propagation losses is generated (480), representing the propagation losses from all possible, potential or hypothesized radiator locations or grid points in the region to the location of each of the sensors. For each of the hypothesized radiator locations or grid points, the ratio is taken (490) of all possible pairs of propagation losses in the set of propagation losses, to thereby generate ratios of hypothesized location power losses. The ratio is taken (470) of all possible pairs of powers in the space/power sample set to thereby produce power ratios for each pair of space/power samples in the set. At each hypothesized location of the transmitter or grid point, the ratio of the estimated propagation loss for each hypothesized source location is subtracted (block 492 and equation 3) from the power ratio to produce a ratio quotient value, and the ratio quotient value is squared (492). The squared values are integrated (494 equation 3) over all pairs of sensors or receivers, to thereby produce a dimensionless minimized mean squared value of propagation loss ratios matched to ratios of estimated or measured power from each grid point to each sensor location. The expected transmission loss ratios may be computed (480) for each of the pairs of sensor locations. The minimum number of sensors recommended for the application is 4. The grid location at which the transmitter is deemed to be located is that grid location having the least or minimum value of minimum mean-squared value of propagation loss matched to ratio of estimated or measured power (496).

What is claimed is:

1. A method for determining the location of a remote electromagnetic radiator, said method comprising:

placing a plurality of electromagnetic sensors on a grid in a region in which said radiator is expected to be located;

receiving electromagnetic radiation emitted from said radiator with said sensors;

estimating the power received by each of said sensors with said corresponding sensor;

integrating the estimated power received from said radiator by the combination of at least four of said sensors in a computer processing step, to thereby generate a space/power sample set;

generating in a computer processing step, a set of propagation losses from all possible radiator locations in the region to the location of each of said sensors;

for each hypothesized or possible radiator location, taking the ratio of all possible pairs of propagation losses in said set of propagation losses in a computer processing step, to thereby generate ratios of hypothesized- or possible-location propagation losses;

taking the ratio of all possible pairs of powers in said space/power set in a computer processing step, to produce power ratios for each pair of space/power samples in said set;

at each hypothesized or possible location of the radiator, determining a value by subtracting from the ratio of powers the ratio of estimated or measured propagation losses for each hypothesized or possible radiator location, and squaring the value in a computer processing step, to produce squared values;

integrating the squared values over all pairs of sensors in a computer processing step, to thereby produce a minimized mean squared value of propagation loss ratio matched to ratios of estimated or measured power from each grid point to each sensor location; and deeming the grid location of the radiator to be at the minimum value of said minimized mean square value of propagation loss matched to ratios of measured power.

2. A method according to claim 1, wherein said step of estimating the power received is performed at the location of the individual one of said sensors.

3. A method for determining the location of a remote electromagnetic radiator, said method comprising:

placing a plurality of electromagnetic sensors in a region in which said radiator is expected to be located;

determining, with each of said sensors, the power of electromagnetic radiation emitted by said radiator and sensed by each of said sensors;

calculating, in at least one computer processing step, ratios of the determined powers;

determining, in at least one computer processing step, power loss between all possible radiator locations and the sensors;

calculating, in at least one computer processing step, ratios of the determined power losses;

integrating, in at least one computer processing step, differences between the ratios of the determined powers and the ratios the determined power losses; and generating, in at least one computer processing step, an error map including an error value at each possible radiator location of the error map, the location with the lowest error value being the location of the radiator.

* * * * *